(12) United States Patent
Sumption et al.

(10) Patent No.: US 8,875,570 B2
(45) Date of Patent: Nov. 4, 2014

(54) WATER TEMPERATURE PROFILE MEASUREMENT APPARATUS

(75) Inventors: Trevor J. Sumption, Brainerd, MN (US); William Hughes, Woodstock, IL (US)

(73) Assignee: Grayden Outdoor LLC, Brainerd, MN (US)

( * ) Notice: Subject to any disclaimer, the term of this patent is extended or adjusted under 35 U.S.C. 154(b) by 364 days.

(21) Appl. No.: 12/836,562

(22) Filed: Jul. 14, 2010

(65) Prior Publication Data

US 2012/0011930 A1 Jan. 19, 2012

(51) Int. Cl.
| G01F 23/00 | (2006.01) |
| G01F 23/18 | (2006.01) |
| G01K 3/14 | (2006.01) |
| G01K 13/00 | (2006.01) |
| B29C 45/14 | (2006.01) |

(52) U.S. Cl.
CPC .................. G01F 23/18 (2013.01); G01K 3/14 (2013.01); G01K 13/00 (2013.01); B29C 45/14639 (2013.01); G01K 2213/00 (2013.01)
USPC ........................................... 73/292; 73/865.1

(58) Field of Classification Search
USPC .................. 73/292, 865.1; 405/186
See application file for complete search history.

(56) References Cited

U.S. PATENT DOCUMENTS

| 3,434,330 | A |  | 3/1969 | Ingham et al. | |
| 3,929,020 | A |  | 12/1975 | Honkanen | |
| 4,124,931 | A |  | 11/1978 | Miele | |
| 4,646,574 | A |  | 3/1987 | Wahl et al. | |
| 4,854,728 | A |  | 8/1989 | Baron et al. | |
| 4,877,330 | A |  | 10/1989 | Torre | |
| 4,953,986 | A | * | 9/1990 | Olson et al. | 374/136 |
| 5,131,165 | A |  | 7/1992 | Benson | |
| 5,351,538 | A |  | 10/1994 | McGuire et al. | |
| 5,553,940 | A |  | 9/1996 | Nishihara | |
| 5,834,641 | A |  | 11/1998 | Sternal | |
| 6,490,093 | B2 | * | 12/2002 | Guest | 359/619 |
| 6,568,266 | B1 |  | 5/2003 | Desa et al. | |
| 6,820,366 | B1 |  | 11/2004 | McDermott | |
| 6,843,771 | B2 | * | 1/2005 | Lo et al. | 600/459 |
| 7,017,822 | B2 | * | 3/2006 | Aisenbrey | 235/487 |
| 7,144,198 | B2 | * | 12/2006 | Hirose et al. | 405/186 |
| 7,547,282 | B2 | * | 6/2009 | Lo et al. | 600/459 |
| 7,618,739 | B2 | * | 11/2009 | Broburg et al. | 429/71 |
| 7,816,027 | B2 | * | 10/2010 | Brandon, II | 429/72 |
| 8,112,164 | B2 | * | 2/2012 | Hollaway | 700/79 |
| 2001/0045104 | A1 | * | 11/2001 | Bailey et al. | 62/510 |
| 2004/0231976 | A1 | * | 11/2004 | Gadini et al. | 204/240 |
| 2004/0249860 | A1 | * | 12/2004 | Stechschulte et al. | 707/104.1 |
| 2005/0125083 | A1 | * | 6/2005 | Kiko | 700/19 |
| 2009/0154182 | A1 | * | 6/2009 | Veenstra et al. | 362/487 |
| 2009/0197478 | A1 | * | 8/2009 | Mandel et al. | 439/736 |
| 2009/0322510 | A1 | * | 12/2009 | Berger et al. | 340/539.1 |

* cited by examiner

Primary Examiner — Hezron E Williams
Assistant Examiner — Rodney T Frank
(74) Attorney, Agent, or Firm — Carole Patent Law CHTD

(57) ABSTRACT

A probe for measurement of water temperature profiles is disclosed herein. In various aspects, the probe may include an electronic assembly and a housing over-molded upon at least portions of the electronic assembly to sealingly enclose the portions of the electronic assembly. The electronic assembly may include a pressure sensor to measure a pressure value indicative of a water depth, and a temperature sensor to measure a water temperature value indicative of a water temperature, a communication interface. Methods of manufacture of the probe are also disclosed herein.

8 Claims, 7 Drawing Sheets

WATER TEMPERATURE PROFILE MEASUREMENT APPARATUS

BACKGROUND OF THE INVENTION

A natural body of water may have a variation in the water temperature between the surface and the bottom. In a lake, for example, the water temperature may be divided into three zones, the epilimnion, the thermocline, and the hypolimnion. The epilimnion, which is the zone of water generally proximate the water surface, generally has a warmer water temperature than the other zones. The water temperature may be generally evenly distributed throughout the epilimnion, as the water in the epilimnion may be generally well mixed by turbulence resulting from wind and wave action. The zone adjacent the bottom is the hypolimnion. Water in the hypolimnion is colder than water in the epilimnion. A transition zone known as the thermocline separates the epilimnion from the hypolimnion. The water temperature in the thermocline is characterized by a water temperature gradient as the water temperature in the thermocline varies from the warm water temperature of the epilimnion to the cool water temperature of the hypolimnion.

A lake or reservoir may have other water temperature structures depending upon the time of the year and the climate of the region. Rivers may have various water temperature structures, and the sea may have various thermal strata, water temperature currents, and other thermal structures.

FIG. 1 illustrates a lake divided into an epilimnion, a thermocline, and a hypolimnion. The corresponding water temperature profile is shown with the z-coordinate indicating depth from the surface and T indicating the water temperature corresponding to the depth. As illustrated in FIG. 1, the thermocline is marked by a steep water temperature gradient. Fish, in this illustration, are gathered about the thermocline. The water temperature profile may be measured by measuring the water temperature at various depths between the water surface and the bottom. For example, temperatures T1, T2, T3 are measured at depths z1, z2, z3 to determine a portion of the water surface temperature profile illustrated in FIG. 1.

Various species of fish may live in a preferred water temperature range, which may be quite limited. Some species of fish travel along the thermocline or break or will prefer other zones or water temperature structures. Accordingly, in order to fish effectively for a certain species of fish, it may be important to locate the thermocline or other strata having the water temperature the that species prefers. Thus, various probes have been devised to measure the water temperature profile. Probes for the measurement of the water temperature profile may have other oceanographic, limnological, or other scientific as well as industrial uses or other usages.

In various aspects, probes for the measurement of the water temperature profile may include sensitive electronics housed within a chamber inside a housing. The housing may be constructed in various ways to seal about the chamber while allowing access to the chamber in order to allow for replacement of the power supply or repair or replacement of other components housed within the chamber. In various aspects, the housing may include various components threadedly connected to one another and with various gaskets, seals, and so forth interposed between the components to seal the chamber from water penetration. Access to the chamber may be obtained by taking apart the threaded connections. Access may be in the form of a cover plate removeably secured about the housing, and various gaskets, seals, and so forth may be included to seal the cover plate. Such threading, gaskets, seals, cover plates, and so forth may be expensive to manufacture and may be prone to leakage thereby resulting in failure of the probe.

Accordingly, there is a need for improved probes for the measurement of water temperature profiles, as well as related processes for the manufacture thereof.

BRIEF SUMMARY OF THE INVENTION

These and other needs and disadvantages are overcome by the methods, systems, and compositions of matter disclosed herein. Additional improvements and advantages may be recognized by those of ordinary skill in the art upon study of the present disclosure.

A probe for measurement of water temperature profiles and related processes for the manufacture of the probe are disclosed herein. In various aspects, the probe includes a pressure sensor to measure a depth value indicative of a water depth, a temperature sensor to measure a water temperature value indicative of a water temperature with the water temperature value generally corresponding to the depth value, and a communication interface. The probe, in various aspects, includes a controller in communication with the pressure sensor to receive the depth value therefrom. The controller may be in communication with the temperature sensor to receive the water temperature value therefrom. The controller may be adapted to store the depth value and the water temperature value in memory. The controller may be in communication with the communication interface to receive a prompt from the communication interface and to output the depth value and the water temperature value from memory to the communication interface in response to the prompt. The probe, in various aspects, includes a power supply adapted to flow electrical current to the pressure sensor, to the temperature sensor, to the communication interface, and to the controller. The probe, in various aspects, includes a housing containing the pressure sensor, the temperature sensor, the communication interface, the controller, and the power supply, the housing over-molded upon external surfaces of the controller and power supply to sealingly enclose the controller and the power supply.

This summary is presented to provide a basic understanding of some aspects of the methods disclosed herein as a prelude to the detailed description that follows below. Accordingly, this summary is not intended to identify key elements of the methods, systems, and compositions of matter disclosed herein or to delineate the scope thereof.

Figure 1:
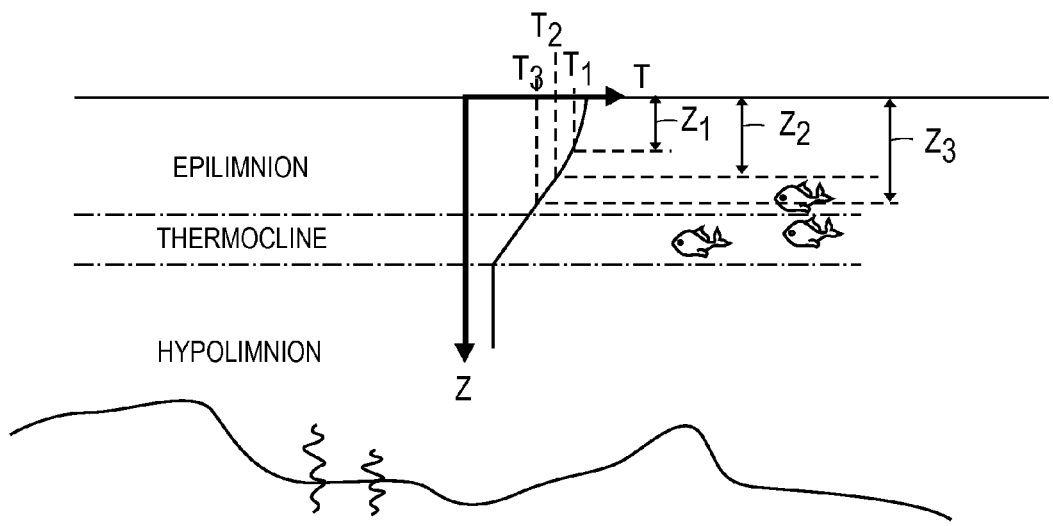
FIG. 1 illustrates by a schematic view an exemplary temperature structure of a lake including the epilimnion, hypolimnion, and thermocline and the corresponding water temperature profile.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof.

DETAILED DESCRIPTION OF THE INVENTION

A probe for the measurement of water temperature profiles in water bodies such as lakes, rivers, and oceans, and related processes for the manufacture of the probe are disclosed herein. In various aspects, the probe includes an electronic assembly and a housing that is over-molded upon at least portions of the electronic assembly. The housing may sealingly enclose those portions of the electronic assembly upon which the housing is over-molded in order to prevent exposure of those portions of the electronic assembly to the water within which the probe may be placed. Accordingly, those portions of the electronic assembly may be maintained substantially dry as the probe is used to measure the water temperature profile in the water body, which may prevent water damage to those portions of the electronic assembly and the attendant failure of the probe.

The housing, in various aspects, may be over-molded over at least portions of the electronic assembly using low-pressure injection molding to encapsulate the portions of the electronic assembly. Accordingly, the housing is formed around surfaces of the electronic assembly to coat the electronic assembly such that the housing is generally biased against the surfaces and may adhere to the surfaces. The portions of the electronic assembly over which the housing is over-molded are thus subsumed within the housing material of the housing, and essentially no cavity exists within a housing interior of the housing, which is thus either occupied by housing material or the electronic assembly, in various aspects. No access is provided to the portions of the electronic assembly over which the housing is over-molded, as these are permanently encased within the housing material, so that the power supply or other components of the electronic assembly are, thus, generally non-replaceable, in various aspects.

The use of low-pressure injection molding in forming the housing may allow the housing material to coat the electronic assembly without damaging the various electronic components or other components of the electronic assembly. The housing material is generally impervious to water, so that the portions of the electronic assembly enclosed within the housing are sealed therein from contact with water external to the housing assembly. In various aspects, the housing may resist the penetration of water to the electronic assembly at depths up to about 300 ft in seawater.

In various aspects, the housing material from which the housing is formed may be Macromelt® thermoplastic resin which is a polyamide or polyolefin resin available from Henkel Chemical Corp. of Düsseldorf, Germany. Exemplary Macromelt® thermoplastic resins include MM 6208S Black, OM 673 Amber, OM 638 Black, OM 641 Amber, OM 646 Black, and OM 687 Black.

The probe, as describe herein, is generally presented in the context of angling, oceanography, limnology, and the measurement of water temperature profiles in water bodies such as lakes, reservoirs, rivers, and the sea. Such description is not intended to restrict the probe to such usage. The probe may have other usages in industry or in the natural environment, as would be recognized by those of ordinary skill in the art upon study of this disclosure.

Figure 2A:
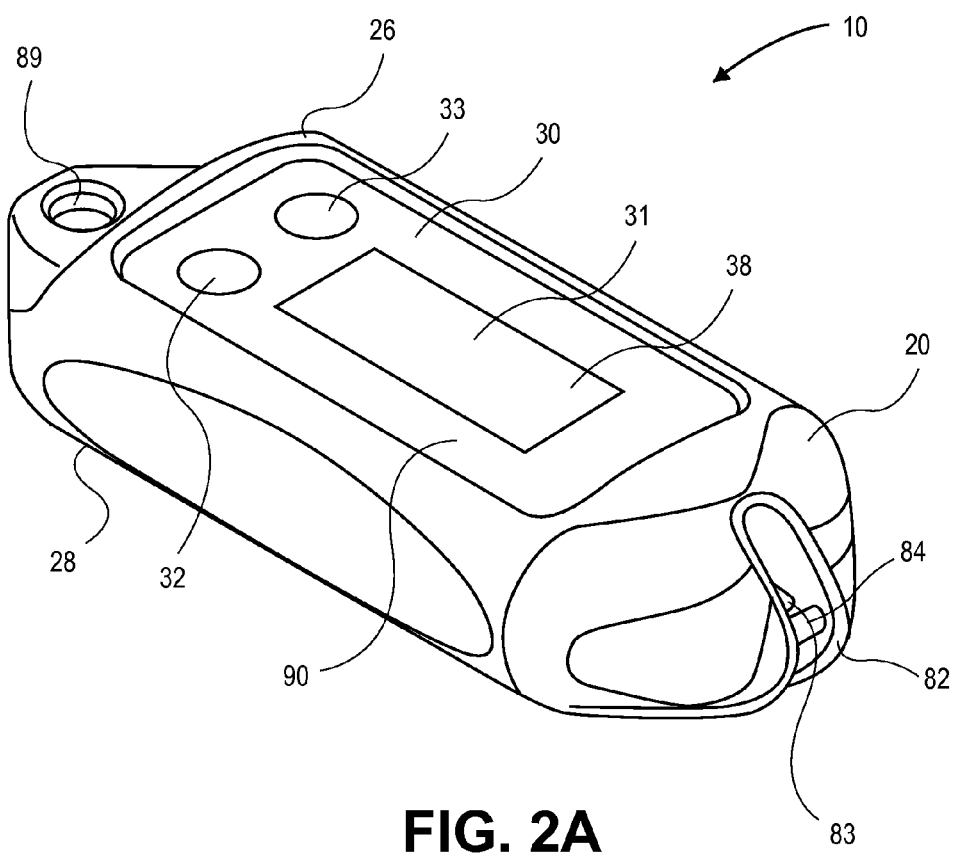
FIG. 2A illustrates by perspective view an exemplary implementation of a probe.
Figure 2B:
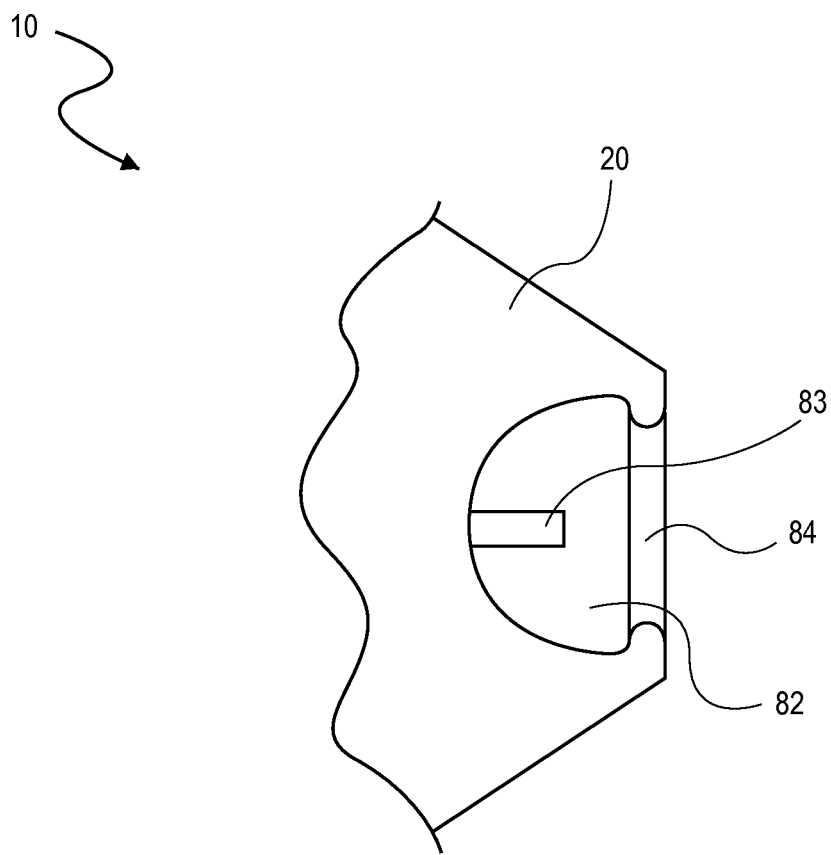
FIG. 2B illustrates by top view portions of the exemplary probe of FIG. 2A.

An implementation of the probe 10 for the measurement of water temperature profiles is illustrated in FIGS. 2A and 2B. As illustrated in FIG. 2A, the probe includes a housing 20 and communication interface 30. The housing 20, in this implementation, has a generally rounded, elongated hydrodynamic shape. Housing 20 defines eye 89, and a line, which includes fishing lines, cables, wires, ropes, chains, and so forth, may be secured to eye 89 to secure the probe 10 to the line. The line may be passed through eye 89 and tied to the probe 10, or various swivels, rings, clips, and so forth may be employed in attaching probe 10 to the line at eye 89.

Communication interface 30 is located about housing surface 26 of housing 20, as illustrated in FIG. 2A. Communication interface 30, in this illustrated implementation, allows the user to input various prompts into the probe 10 to control the operation of the probe 10. Communication interface 30 may communicate depth values and corresponding water temperature values detected by the probe 10 to the user in response to the prompts. The communication interface 30 may communicate the status of the probe 10, such as whether the probe 10 is in an on state or an off state, and other operational settings of the probe 10 to the user. The communication interface 30 may allow the user to alter the status and/or various operational settings of the probe 10. For example, the user may adjust operational settings such as units (S.I. units or English units), depths at which the water temperature is to be detected, and water type (i.e. fresh water or seawater).

The depth of the probe may be measured by measuring the water pressure. Water type—freshwater or seawater—alters the relationship between pressure and depth. For example, the density of freshwater is 998.2 kg/m3 at a water temperature of 20° C. A 1 m change is depth corresponds to a pressure change=(998.2 kg/m$^3$) (9.8066 m/s$^2$) (1 m)=9,789 Pa. Accordingly, in freshwater, a pressure change of 9.789 kPa indicates a depth change of 1 m.

At 20° C., the specific gravity of seawater is 1.025, so that a 1 m change in depth in seawater corresponds to a pressure change of (1.025)(9,789 Pa)=10,034 Pa. Accordingly, in saltwater, a pressure change of 10.034 kPa indicates a depth change of 1 m. The user may toggle probe 10 between freshwater operation and saltwater operation to account for this change in depth-pressure relationship due to the variation in density between freshwater and saltwater using communication interface 30.

In the implementation of FIG. 2A, the communication interface 30 includes display screen 31, switch 32, and switch 33. Switch 32, for example, may alter the status of the probe between the off-state and the on-state. Display screen 31 may be, for example, a liquid crystal display (LCD). The depth values and the corresponding water temperature values may be displayed to the user by display screen 31, and the user may scroll through the depth values and corresponding water temperature values by, for example, manipulation of switch 33. Various manipulations of switch 32 in combination with switch 33 may adjust the operational settings of the probe 10. In other implementations (not shown), the communication interface may include various displays and input devices to interact with the user. In other implementations (not shown), the communication interface, such as communication interface 30, may include one or more digital connectors to allow the probe, such as probe 10, to accept inputs from and/or output to various digital devices such as a cellular telephones, lap-top computers, global positioning system (GPS) units, and so forth.

FIG. 2B illustrates a portion of housing 20 of probe 10 including slot 82, temperature sensor element 83, and bar 84. As illustrated in FIG. 2B, housing 20 defines slot 82, and temperature sensor element 83 of temperature sensor 80 protrudes forth from housing 20 into slot 82. Bar 84 extends across slot 82 to protect temperature sensor element 83. Bar 84 may be a bar, a plate, or other structure that may generally shield temperature sensor element 83. Accordingly, water may flow through slot 82 to contact temperature sensor element 83 so that temperature sensor 80 may measure a water temperature of the water. Sensor element 83, in various implementations, may be, for example, a thermocouple or a thermistor, and the temperature sensor 80 includes temperature sensor element 83 and the associated circuitry.

Figure 3:
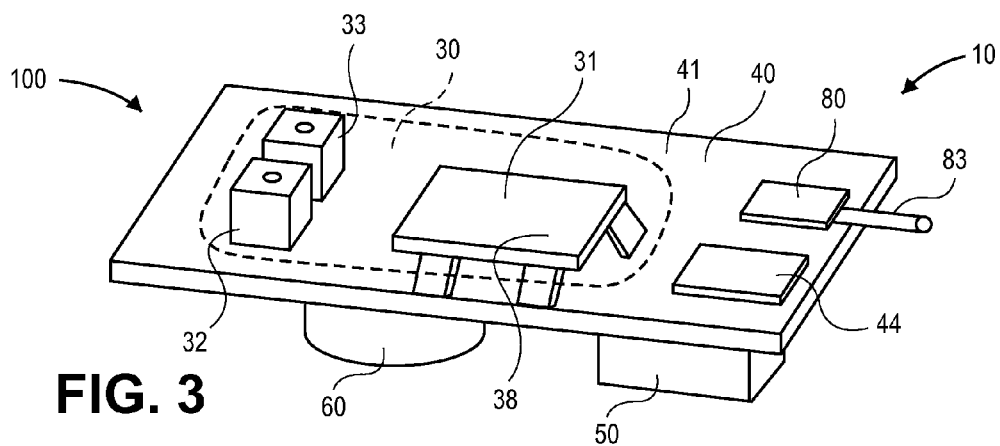
FIG. 3 illustrates by perspective view portions of the exemplary probe of FIG. 2A including an exemplary electronic assembly.

FIG. 3 illustrates portions of probe 10 including electronic assembly 100. As illustrated in FIG. 3, electronic assembly 100 includes controller 40, pressure sensor 60, temperature sensor 80, communication interface 30, and power supply 50.

The controller 40, as illustrated in FIG. 3, includes circuit board 41 and microcontroller 44, which is affixed to the circuit board 41. The microcontroller may be, for example, an 8 bit or 16 bit microcontroller such as microchip PIC16F914 manufactured by Microchip Technology Inc., Chandler, Ariz. Pressure sensor 60, temperature sensor 80, communication interface 30, and power supply 50 are affixed to circuit board 41 such that the controller 40 is in electrical communication with the pressure sensor 60, temperature sensor 80, communication interface 30, and power supply 50. Accordingly, the microcontroller 44 may receive prompts from the communication interface 30 and output to the communication interface 30 and may regulate the operation of the pressure sensor 60, temperature sensor 80, communication interface 30, and power supply 50 including in response to prompts received from the communication interface 30. The microcontroller may include a microprocessor, memory, clock, I/O interfaces, and so forth. The circuit board 41 includes the circuitry necessary to support the microcontroller 44 and may include memory, clock, A/D converter, and so forth. The circuit board 41 includes the circuitry required to allow communication between the controller 40 including microcontroller 44 and the pressure sensor 60, temperature sensor 80, communication interface 30, and power supply 50 and to communicate electrical power from the power supply 50 to the controller 40, pressure sensor 60, temperature sensor 80, communication interface 30, and power supply 50 in this implementation.

Figure 4:
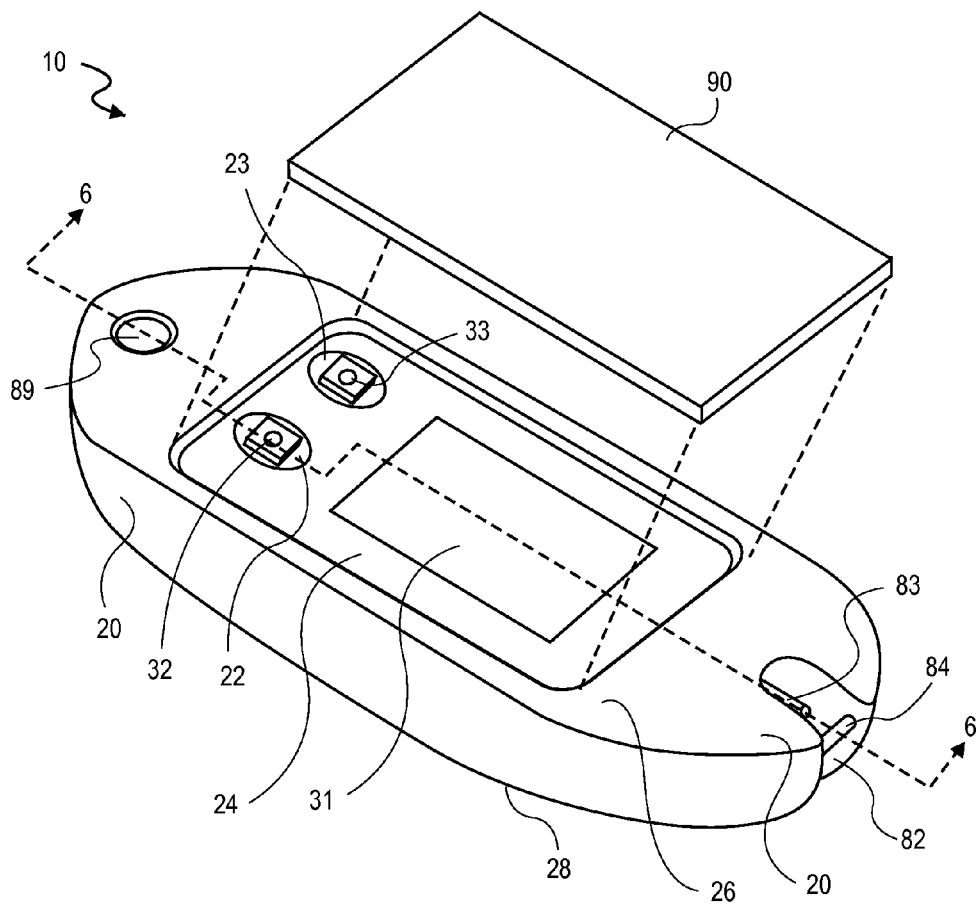
FIG. 4 illustrates by exploded perspective view portions of the exemplary probe of FIG. 2A including a housing over-molded upon the electronic assembly.

FIG. 4 illustrates probe 10 with housing 20 over-molded over portions of the electronic assembly 100 to sealingly enclose these portions of the electronic assembly 100. As illustrated in FIG. 4, the housing 20 is over-molded upon external surfaces of the controller 40 and power supply 50 to sealingly enclose the entirety of the controller 40 and the power supply 50. The power supply 50, in this implementation, is generally non-replaceable as the housing 20 is over-molded over the power supply 50 and no access is provided through the housing to the power supply 50. The power supply 50 is permanently sealed by encasement within housing 20. In various implementations, the power supply 50 may be, for example, a lithium battery or similar power source having sufficient electrical storage capacity to power the probe, such as probe 10, over a period of several years under anticipated operating conditions. When the power supply 50 is exhausted, the probe 10 may be recycled or otherwise disposed of.

The housing 20 is over-molded over portions of the temperature sensor 80, so that portions of temperature sensor element 83 protrude from housing 20 to contact water passing about housing 20, so that temperature sensor 80 may measure a water temperature of the water. The remaining portions of temperature sensor 80 other than the protruding portion of temperature sensor element 83 are sealingly enclosed within the housing 20.

The housing 20, as illustrated in FIG. 4, is over-molded about portions of communication interface 30 such that portions of communication interface 30 are exposed. Housing 20 includes recesses 22, 23, and portions of switches 32, 33 protrude through recesses 22, 23, respectively, such that these protruding portions of switches 32, 33 are not over-molded by housing 20, which allows the user to manipulate switches 32, 33. The remaining portions of switches 32, 33 are sealingly over-molded by housing 20. In other implementations (not shown), recesses 22, 23 may extend to circuit board 41 so that the switches are not overmolded. The housing 20 is over-molded about portions of display screen 31 of communication interface 20 such that display surface 38 of display screen 31 of communication interface 30 is exposed to allow the display surface 38 to be viewed.

As illustrated in FIG. 4, a recessed portion 24 of housing surface 26 of housing 20 surrounds exposed portions of the communication interface 30 including display surface 38 of display 31 and portions of switches 32, 33. Overlay 90 is placed over these exposed portions of the communication interface 30 including display surface 38 of display 31 and portions of switches 32, 33. Portions of the overlay 90 generally proximate the perimeter of overlay 90 are sealingly secured to portions of the housing 20 generally proximate the perimeter of recessed portion 24 of housing 20 to enclose the exposed portions of the communication interface 30 including display surface 38 of display 31 and the portions of switches 32, 33 in recesses 22, 23 that are not over-molded by housing 20. The overlay 90 may be generally transparent to allow the user to view display surface 38 of display 31 and the overlay may be sufficiently flexible to allow the user to manipulate switches 32, 33 through overlay 90. For example, overlay 90 may be sealingly engaged with the housing 20 using various adhesives, solvent welding, and so forth. In some implementations, the overlay 90 may include a pressure sensitive adhesive backing. The overlay 90 including the sealing engagement with the housing 20 is of sufficient strength to resist the pressures developed over the anticipated operating range of the probe 10, in various implementations. In various implementations, the overlay may be made of polycarbonate or polyester and may have a thickness ranging from about 0.010 inch to about 0.030 inch.

Figure 6:
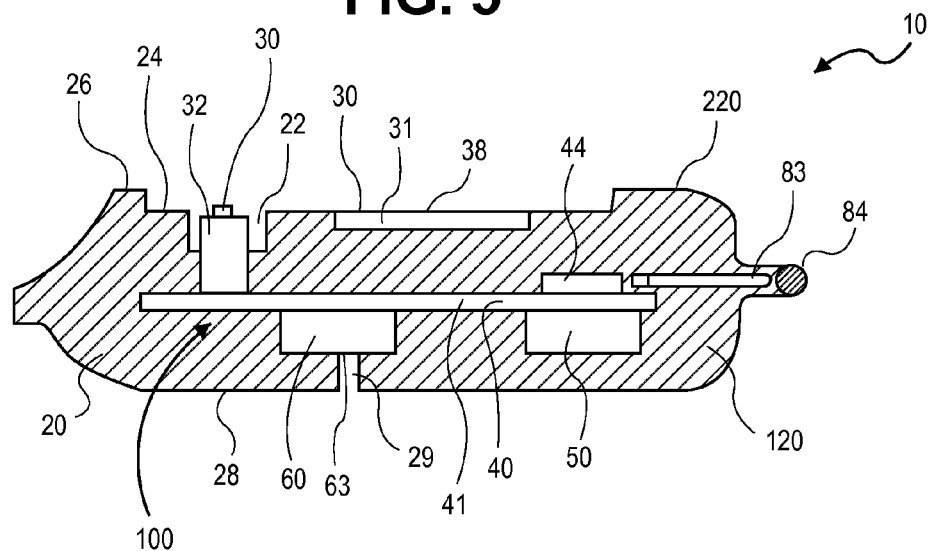
FIG. 6 illustrates by cross-sectional view portions of the exemplary probe of FIG. 2A.

FIG. 6 illustrates a cross sectional view through probe 10. As illustrated in FIG. 6, housing 20 is over-molded over portions of the electronic assembly 100 to sealingly enclose these portions of the electronic assembly 100. The electronic assembly 100 includes controller 40 and power supply 50, and, as illustrated, the housing 20 is over-molded upon external surfaces of the controller 40, which includes circuit board 41 and microcontroller 44, and power supply 50 to sealingly enclose the entirety of the controller 40 and the power supply 50 portions of the electronic assembly 100. Water may not generally penetrate from the housing exterior 220 of the housing 20 to the housing interior 120 of the housing 20 at pressures encountered over the range of depths that the probe 10 is designed to operate at. Furthermore, in order to prevent water from seeping into housing interior 120 of housing, 20, no access is provided to the housing interior 120 of housing 20 so that neither controller 40 nor power supply 50 may be accessed, for example, to be serviced or replaced.

As illustrated in FIG. 6, the material of housing 20 is formed around surfaces of the controller 40 and the power supply 50 to coat the surfaces of the power supply 40 and the controller 50 such that the housing 20 is generally biased against these surfaces and may adhere to these surfaces. The portions of the electronic assembly 100 including the controller 40 and the power supply 50, over which the housing 20 is over-molded are thus subsumed within the housing material of the housing 20 in this implementation. No access is provided through the housing 20 to the portions of the electronic assembly that are over-molded by the housing 20 to allow the portions of the electronic assembly 100 within housing 20 to be replaced, repaired, or otherwise accessed, as such access may provide a pathway for water to infiltrate into the housing. As illustrated, essentially no void space exists within the housing interior 120 of the housing 20, which is either occupied by the housing material(s) of which the housing 20 is formed or at least portions of the electronic assembly including the controller 40 and the power supply 50. Accordingly, there is substantially no void space for water to infiltrate into or occupy within the housing interior 120.

The electronic assembly 100, in this implementation, includes temperature sensor 80. As illustrated, portions of temperature sensor element 83 protrude from housing 20 so that these protruding portions may contact water passing about housing 20. Bar 84, formed as part of housing 20 in this implementation, protects temperature sensor element 83. The remaining portions of temperature sensor 80 other than the protruding portion of temperature sensor element 83 are sealingly enclosed within the housing 20 so that the housing is formed sealingly around portions of the temperature sensor 80 portion of the electronic assembly 100.

The electronic assembly 100, in this implementation, includes pressure sensor 60. As illustrated in FIG. 6, the housing 20 is over-molded over portions of the pressure sensor 60. Port 29 through a portion of housing 20 allows water to contact pressure sensor element 63 of pressure sensor 60 so that the pressure sensor 60 may measure the pressure of the water. The remaining portions of pressure sensor 60 other than pressure sensor element 63 are over-molded by housing 20 and are thus sealingly enclosed within the housing 20. Accordingly, portions of the pressure sensor 60 portion of the electronic assembly 100, in this implementation, are sealingly enclosed within housing 20.

Figure 5:
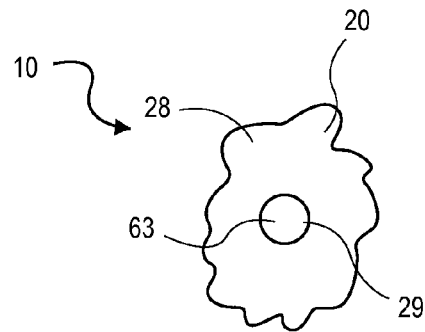
FIG. 5 illustrates by bottom view portions of the exemplary probe of FIG. 2A.

FIG. 5 illustrates a portion of housing surface 28 of housing 20 that includes port 29. Port 29 is formed in housing 20 and port 29 terminates at pressure sensor element 63 of pressure sensor 60. Accordingly, water may enter port 29 to contact the pressure sensor element 63 of pressure sensor 60, which allows pressure sensor 60 to measure the pressure of the water and, hence, determine the depth of probe 10.

The electronic assembly 100, in the implementation of FIG. 6, includes communication interface 30. The housing 20, as illustrated in FIG. 6, is over-molded about portions of communication interface 30 to sealingly enclose these portions of the communication interface 30. Accordingly, portions of the communication interface 30 portion of the electronic assembly 100 are sealingly enclosed within housing 20 by over-molding. For example, as illustrated in FIG. 6, the portion of switch 32 that protrudes through recess 22 is not over-molded by housing 20, and the remaining portion of switch 32 is sealingly over-molded by housing 20. Although not shown in FIG. 6, the portion of switch 33 that protrudes through recess 23 is not over-molded by housing 20, and the remaining portion of switch 33 is sealingly over-molded by housing 20 similarly to switch 23 in recess 22. The housing 20 is over-molded about portions of display screen 31 of communication interface 30 such that display surface 38 of display screen 31 of communication interface 30 is exposed, as illustrated.

Figure 7:
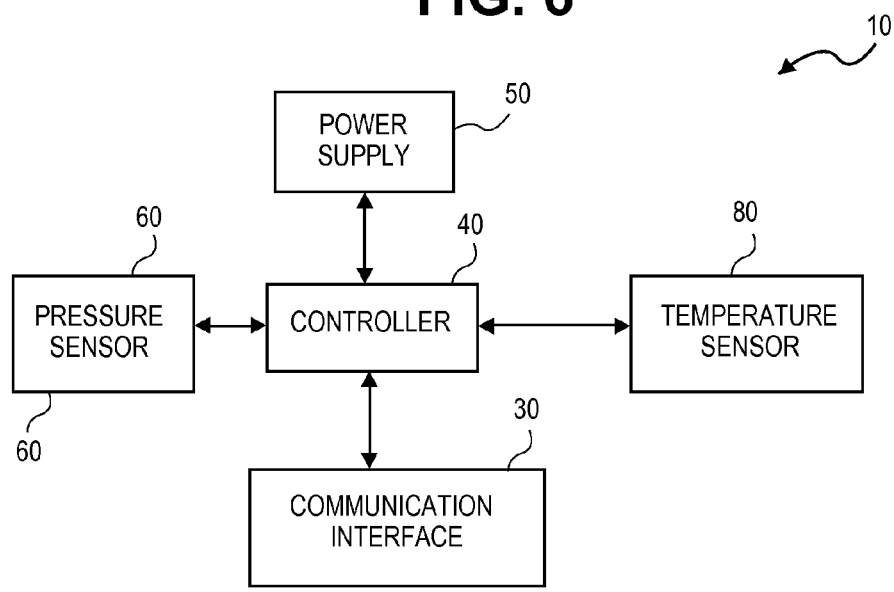
FIG. 7 illustrates by block diagram the interaction between various components of the exemplary probe of FIG. 2A.

FIG. 7 illustrates by block diagram various interactions between the controller 40, pressure sensor 60, temperature sensor 80, communication interface 30, and power supply 50 included in electronic assembly 100 of probe 10. As illustrated in FIG. 7, controller 40 is in communication with power supply 50 to regulate power supply 50 including the transmission of power from power supply 50 to the controller 40, the pressure sensor 60, the temperature sensor 80 and the communication interface 30. In various implementations, the controller 40 may monitor the availability of power from the power supply 50 (i.e. monitor the charge remaining in the power supply 50).

As illustrated in FIG. 7, the controller 40 is in communication with pressure sensor 60. The controller 40 may communicate with pressure sensor 60 to regulate the operation of the pressure sensor 60. For example, the controller 40 may query the pressure sensor 60 to obtain a pressure value indicative of the pressure of the water surrounding the probe 10, and hence, the depth of the probe 10. The controller 40 may convert the pressure value into an equivalent depth value indicative of depth of the probe 10 in a column of water. The controller 40 may convert the pressure value into a depth value based upon seawater or based upon freshwater, as selected by the user, in various implementations. The controller 40 may store the depth value in memory. In various implementations, the pressure sensor 60 may be, for example, piezo-resistive, capacitive, or silicon micro-machined.

The controller 40 is in communication with temperature sensor 80, as illustrated in FIG. 7. The controller 40 may communicate with temperature sensor 80 to regulate the operation of the temperature sensor 80. For example, the controller 40 may query the temperature sensor 80 to obtain a water temperature value indicative of the water temperature of the water surrounding the probe 10. The controller 40 may store the water temperature value in memory. The controller 40 may query the temperature sensor 80 and the controller 40 may query the pressure sensor 60 generally concurrently with one another so that the water temperature value obtained from the temperature sensor 80 corresponds with the depth value obtained from the pressure sensor 60. In various implementations, the temperature sensor 80 may be, for example, a thermistor, RTD, thermocouple, or silicon temperature sensor.

As illustrated in FIG. 7, the controller 40 is in communication with the communication interface 30. Accordingly, prompts may be transmitted from the communication interface 30 to the controller 40 to alter the operation of the controller 40, and, thus, of the power supply 50, the pressure sensor 60, and the temperature sensor 80, and otherwise alter the operation of the probe 10. The controller 40 may output information from memory to the communication interface 30, and the output of information from memory to the communication interface 30 may be initiated by prompt(s) transmitted from the communication interface 30 to the controller 40. The information output to the communication interface 30 by the controller 40 may include one or more depth values stored in memory and may include one or more water temperature values stored in memory. The depth values and the water temperature values may correspond to one another. In various implementations, the depth values and water temperature values may be output to the communication interface 30 so as to be displayed upon display surface 38 of display screen 31. Prompts communicated to the controller 40 from the communication interface 30 may cause the controller 40 to scroll the depth values and corresponding temperature values on display surface 38. That is, depth values and corresponding temperature values may be displayed one pair at a time in order of increasing or decreasing depth value or temperature value on display surface 38.

In use, a probe, such as probe 10, may be secured to a line, set at an on-state, and lowered into a water body by a line secured thereto. The probe may then measure depth values indicative of the depth of the probe from the surface within the body of water using a pressure sensor, such as pressure sensor 60, and the probe may measure the corresponding water temperature values using a temperature sensor, such as temperature sensor 80. The probe measures one or more depth values and one or more water temperature values generally corresponding to the depth values. By measuring a number of depth values and corresponding water temperature values as the probe is lowered into the water body, the probe records a water temperature profile of the water body.

The probe may be raised out of the water body by the line. Upon recovery of the probe, the user may prompt the probe through a communication interface, such as communication interface 30, to cause the probe to display the water temperature profile as a series of depths and corresponding water temperature values upon a display surface such as display surface 38 of communication interface 30.

Figure 8:
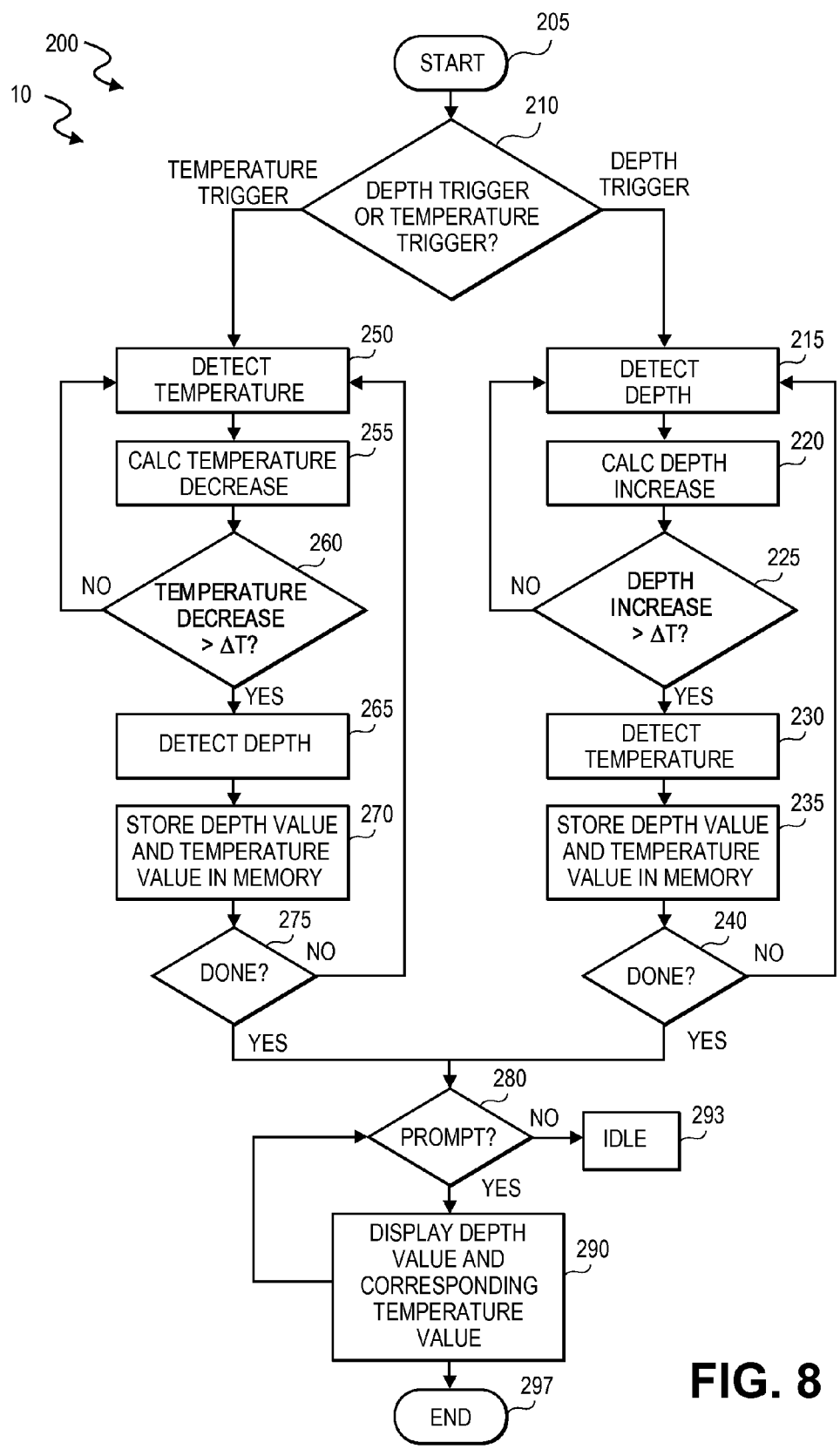
FIG. 8 illustrates by process flow chart various exemplary operations that may occur during usage of the exemplary probe of FIG. 2A.

Operations during usage of the probe are exemplified by process 200, which is illustrated in FIG. 8. As illustrated in FIG. 8, process 200 is initiated at step 205. At step 210, the user may set the probe to trigger based upon depth change or to trigger based upon water temperature change. When the probe triggers, the depth value and the corresponding water temperature value are detected using the pressure sensor and the temperature sensor, respectively, and the depth value and the corresponding water temperature value are then stored in memory.

If the probe is set to trigger based upon depth, process 200 proceeds from step 210 to step 215. At step 215 the probe detects the depth value and at step 220 the probe calculates the depth value increase either from the previously recorded depth value or from 0 if this is the first depth value to be recorded. At step 225, process 200 checks to see if the depth value increase is greater than depth increment ΔD. If no, process 200 loops back to step 215. If yes, process 200 detects the water temperature value at step 230. The depth value and the corresponding water temperature value are then stored in memory at step 235. At step 240, process 200 checks for an done condition, which could be no further increase in depth value meaning the probe has hit bottom or is not being lowered any further. In various implementations, the depth increment ΔD may be, for example, 1 m or 5 ft so that the water temperature values are then recorded and displayed at 1 m or 5 ft intervals, respectively. That is, the water temperature value is recorded at depths of 1 m, 2 m, 3 m . . . or the water temperature values are recorded at depths of 5 ft, 10 ft, 15 ft . . . , and so on. The water temperature profile, per this example, includes a series of depth values that vary incrementally from one another by ΔD and the corresponding water temperature values at those depth values.

If the probe is set to trigger based upon water temperature, process 200 proceeds from step 210 to step 250. At step 250, the probe detects the water temperature value, and, at step 255, the probe calculates the water temperature value decrease either from the previously recorded water temperature value. The probe may detect an initial water temperature value as the probe is placed into the water. At step 260, process 200 checks to see if the water temperature value decrease is greater than water temperature increment ΔT. If no, process 200 loops back to step 250. If yes, process 200 detects the depth value at step 265. The depth value and the corresponding water temperature value are then stored in memory at step 270. At step 275, process 200 checks for an done condition, which could be no further decrease in water temperature value meaning the probe has hit bottom or is not being lowered any further. In various implementations, the water temperature increment ΔT may be, for example, 1° F. so that the depth values are then recorded and displayed at 1° F. intervals. That is, the depth values corresponding to water temperatures of, for example, 69° F., 68° F., 67° F. . . . and so on are recorded. The water temperature profile includes a series of depths at which the water temperature varies by 1° F. in this example.

Upon detection of the done condition at either step 240 or step 275, process 200 proceeds from either step 240 or from step 275 to step 280. At step 280, process 200 loops to an idle condition at step 293 until a prompt is received. Upon receiving the prompt, process 200 displays the depth value(s) and corresponding water temperature value(s), for example, at display surface 38 of display screen 31. The user may then view the water temperature profile by scrolling between the depth values and the corresponding water temperature values displayed upon display surface 38 as process 200 loops between step 280 and step 290. Process 200 terminates at step 297.

Figure 9:
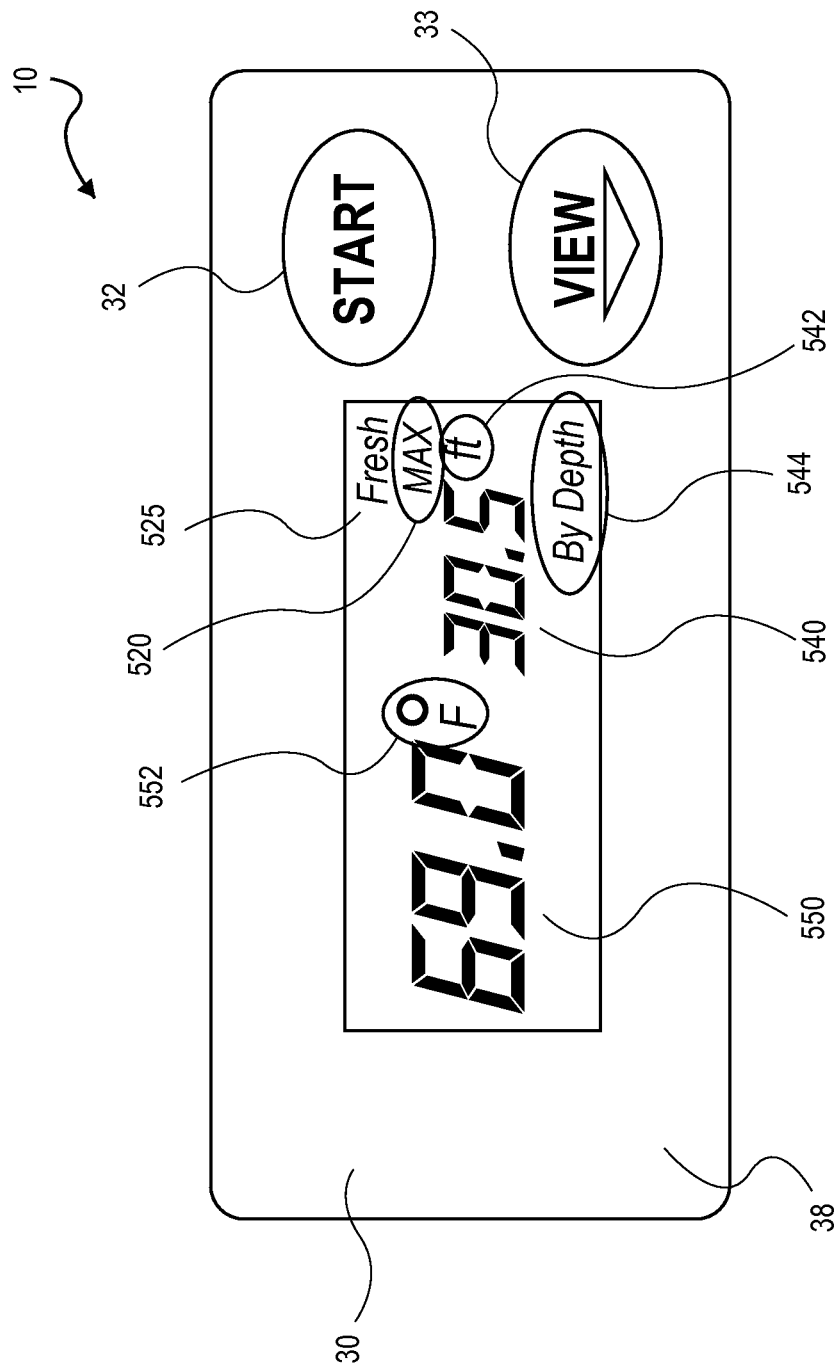
FIG. 9 illustrates by top-view a display surface of the exemplary probe of FIG. 2A; and, FIG. 10 illustrates by process flow chart an exemplary process of manufacturing a probe, such as the exemplary probe of FIG. 2A.

Various attributes of display surface 38 are illustrated in FIG. 9. As illustrated in FIG. 9, switch 32 is configured as a start button so that initiation of the probe may occur by switching switch 32. Display surface 38 includes indicator 525, which indicates that the probe is set for freshwater. Indicator 525 may be toggled between freshwater and seawater. Indicator 544 indicates that the probe is set to trigger on depth. Indicator 544 may be toggled between depth trigger and temperature trigger. Indicator 540 displays a depth value and indicator 550 displays the corresponding water temperature value. The units of the depth value and the units of the water temperature value are indicated by indicators 542 and 552, which are ft and ° F., respectively, in this exemplary implementation. Indicator 520 indicates that the depth value 540 is the maximum depth value attained and thus the maximum depth value at which the water temperature value was recorded. The user may scroll to display other depth values and corresponding water temperature values by toggling switch 33 in order to view the water temperature profile.

Figure 10:
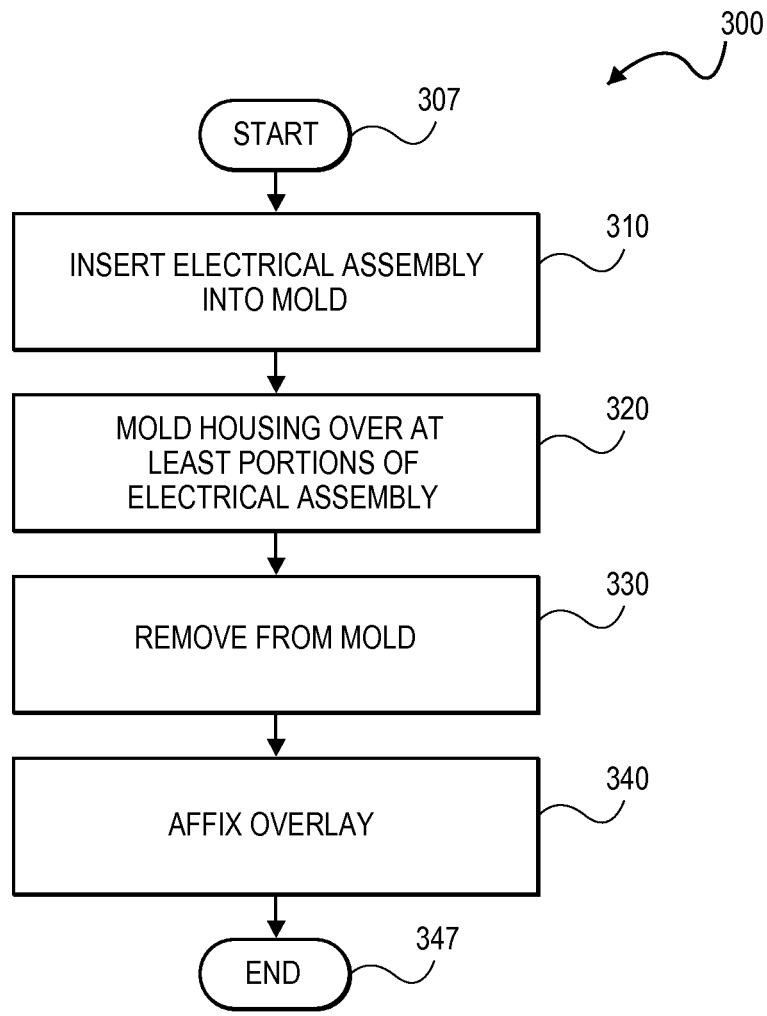

FIG. 10 illustrates process 300 for manufacturing a probe, such as probe 10. Process 300 is entered at step 307. At step 310, an electrical assembly, such as electrical assembly 100, is inserted into a mold. At step 320, the housing, such as housing 20, is over-molded over at least portions of the electrical assembly. At step 330, the housing combined with the electrical assembly is removed from the mold. At step 340, an overlay, such as overlay 90, is sealingly secured to portions of the housing. Process 300 terminates at step 347.

The foregoing discussion along with the Figures discloses and describes various exemplary implementations. These implementations are not meant to limit the scope of coverage, but, instead, to assist in understanding the context of the language used in this specification and in the claims. Upon study of this disclosure and the exemplary implementations herein, one of ordinary skill in the art may readily recognize that various changes, modifications and variations can be made thereto without departing from the spirit and scope of the inventions as defined in the following claims.

What is claimed is:

1. A submersible probe for measurement of a water temperature profile, consisting essentially of:
    a communication interface;
    a controller in communication with a pressure sensor to receive depth values indicative of water depths therefrom, the controller in communication with a temperature sensor to receive water temperature values indicative of water temperatures therefrom, the controller adapted to store a water temperature profile comprising water temperature values and depth values in correspondence to one another, the controller in communication with the communication interface to output the water temperature profile to the communication interface in response to a prompt received from the communication interface;
    a power supply adapted to flow electrical current to the pressure sensor, to the temperature sensor, to the communication interface, and to the controller;
    a housing containing the pressure sensor, the temperature sensor, the communication interface, the controller, and the power supply, the housing comprising a housing material over-molded about the power supply to sealingly enclose the power supply, the housing material surrounds entirely the power supply and the housing material is biased against several surfaces of the power supply, the housing adapted for attachment to a line to allow the housing to be positioned within water; and
    an overlay that sealingly engages with the housing to enclose portions of the communication interface, the remaining portions of the communication interface over-molded by the housing.

2. The apparatus, as in claim 1, wherein the housing is over-molded upon the controller.

3. The apparatus, as in claim 1, wherein a pressure sensor port of the pressure sensor is exposed externally and remaining portions of the pressure sensor are generally over-molded by the housing.

4. The apparatus, as in claim 1, wherein a temperature sensor port of the temperature sensor is exposed externally and remaining portions of the temperature sensor are generally over-molded by the housing.

5. The apparatus, as in claim 1, wherein the housing is over-molded upon the external surfaces of the power supply by low-pressure injection molding.

6. The apparatus, as in claim 5, wherein the housing material comprises a plastic material formed from Macromelt® OM 646 Black.

7. The apparatus, as in claim 1, wherein the housing sealingly encloses the controller and the power supply to a depth of about 300 ft in seawater.

8. The apparatus, as in claim 1, wherein the depth value is alterable between a fresh water depth value and a seawater depth value.

* * * * *